(12) United States Patent
Lucey et al.

(10) Patent No.: US 9,406,162 B2
(45) Date of Patent: Aug. 2, 2016

(54) SYSTEM AND METHOD OF GENERATING A VIDEO OF AN AVATAR

(71) Applicant: Commonwealth Scientific and Industrial Research Organisation, Campbell ACT (AU)

(72) Inventors: Simon Lucey, Campbell ACT (AU); Gautam Tendulkar, Campbell ACT (AU)

(73) Assignee: COMMONWEALTH SCIENTIFIC AND INDUSTRIAL RESEARCH ORGANISATION, Campbell Australian Capital Territory (AU)

( * ) Notice: Subject to any disclaimer, the term of this patent is extended or adjusted under 35 U.S.C. 154(b) by 195 days.

(21) Appl. No.: 13/900,023

(22) Filed: May 22, 2013

(65) Prior Publication Data

US 2013/0314405 A1 Nov. 28, 2013

(30) Foreign Application Priority Data

May 22, 2012 (AU) .................................. 2012902108

(51) Int. Cl.
- *G06T 13/40* (2011.01)
- *G06T 13/80* (2011.01)
- *G06T 13/20* (2011.01)

(52) U.S. Cl.
CPC ................. *G06T 13/40* (2013.01); *G06T 13/20* (2013.01); *G06T 13/80* (2013.01)

(58) Field of Classification Search
None
See application file for complete search history.

(56) References Cited

U.S. PATENT DOCUMENTS

| | | | |
|---|---|---|---|
| 2004/0179037 A1* | 9/2004 | Blattner et al. | 345/751 |
| 2008/0215995 A1* | 9/2008 | Wolf | G06T 11/00 715/758 |
| 2008/0306951 A1* | 12/2008 | Rodefer | 707/9 |
| 2011/0246562 A1* | 10/2011 | Kang | 709/203 |
| 2011/0304629 A1* | 12/2011 | Winchester | 345/473 |

FOREIGN PATENT DOCUMENTS

| | | | | |
|---|---|---|---|---|
| WO | WO 03/073322 | | 9/2003 | |
| WO | WO03007332 | * | 9/2003 | G06F 17/30 |

OTHER PUBLICATIONS

Theobald et al, Real-time Expression Cloning using Appearance Models, 2007, ACM.*
Koller et al, Protected Interactive 3D Graphics Via Remote Rendering, 2004, ACM.*

* cited by examiner

*Primary Examiner* — Kee M Tung
*Assistant Examiner* — Xin Sheng
(74) *Attorney, Agent, or Firm* — Stephen T. Olson; Harness, Dickey & Pierce, P.L.C.

(57) ABSTRACT

A method of generating an image enables animating an avatar on a device with limited processing capabilities. The method includes receiving, on a first computing device, a first image; sending, on a data interface of the first computing device, the first image to a server; receiving, on the data interface and from the server, shape data corresponding to an aspect of the first image; and generating, by a processor of the first computing device, a primary output image based at least upon the shape data and avatar data.

16 Claims, 8 Drawing Sheets

SYSTEM AND METHOD OF GENERATING A VIDEO OF AN AVATAR

CROSS-REFERENCE TO RELATED APPLICATIONS

This application claims the benefit and priority of Australian Patent Application No. 2012902108, filed May 22, 2012. The entire disclosure of the above application is incorporated herein by reference.

FIELD

The present invention relates to image generation. In particular, although not exclusively, the invention relates to generating an image for a video sequence.

BACKGROUND

This section provides background information related to the present disclosure which is not necessarily prior art.

User generated content (UGC) is becoming more and more popular as digital cameras are now commonplace on a multitude of devices. A user may record a video of themselves, and simply upload or send the video unchanged, or modify or edit the video prior to upload.

Image processing software of the prior art enables users to apply filters to photographs to give a special effect. Examples of such an effect include simulating an old camera through washed out images or light leaks, or by adding filters to enhance a specific color.

A problem with the image processing software of the prior art is that the filters are content independent. While the filtered images initially appear personalized, the same filter applied to several images can make images actually appear more similar to each other than they originally did.

Personalized video generation software of the prior art also enables a user to add his or her face (or the face of another user) to a video sequence. The video then appears, at least on a superficial level, to be customized to that user.

A problem with the video generation software of the prior art is that the user input is limited, resulting in a limited variability of expression.

On the other end of the spectrum is manual video and image editing and generation software, such as that used in computer generated animations for film. While such software allows a user to create any type of video or image, it is generally complex and time consuming, and therefore not suitable to everyday users. Accordingly, there is a need in the art to provide consumers with improvements and advantages over the above described prior art, to overcome and alleviate one or more of the above described disadvantages of the prior art, and to provide a useful commercial choice.

SUMMARY

This section provides a general summary of the disclosure, and is not a comprehensive disclosure of its full scope or all of its features.

A method of generating an image is disclosed in which a first image is received on a first computing device and sent to a server on a data interface of the first computing device. Shape data corresponding to an aspect of the first image is received on the data interface and from the server, and a primary output image based at least upon the shape data and avatar data is generated by a processor of the first computing device. In accordance with one aspect, the shape data may include a 3D model of a user's face as depicted in the image.

The shape data may also include 3D models of faces of several users as depicted in the image. Generating the primary output image then includes applying the shape data to the avatar data. In accordance with another aspect, the shape data may include Active Appearance Model (AAM) parameters such that the primary output image is generated, in part, by applying the AAM parameters to avatar data. Generating the primary output image may further include applying a mapping function to the shape data according to the avatar data. The method may further include receiving, on the data interface, an identifier associated with the avatar data.

As disclosed herein, the method may further include sending the identifier to the server, wherein the server generates a server output image based upon server avatar data associated with the identifier, and the shape parameters. Alternatively, the method may include sending the avatar data to the server, wherein the server avatar data includes the sent avatar data. In certain aspects, the server output image is identical to the primary output image. Alternatively, the server may generate the server output image according to a different algorithm than an algorithm used by the first computing device to generate the primary output image.

The method may further include sending, on the data interface, a request to the server to send the server output image to a user of a second computing device, wherein the request includes contact details of the user; and sending, from the server and to the user of the second computing device, using the contact details of the user, the server output image.

The method may further include sending, on the data interface, a request to the server to share primary output image with a user of a second computing device, wherein the request includes contact details of the user and a selected avatar; and sending, from the server and to the user of the second computing device, using the contact details of the user, the shape parameters and the selected avatar, for generation of the primary output image by the second computing device. Sending the selected avatar may include sending an identifier associated with the selected avatar. Generating the primary output image may include modifying the first image.

The method may further include sending, on the data interface, a request to the server to upload the server output image to a social media site or a video sharing site, wherein the request includes details of the social media site or the video sharing site, and a selected avatar; and sending, from the server and to the social media site or the video sharing site, using the details of the social media site or the video sharing site, the server output image.

According to certain embodiments, the first image is encoded. The first image may also include an image of a video sequence.

The method may further include receiving, on the first computing device, a second image, wherein the first image and the second image comprise images of a video sequence; sending, on the data interface, the second image to a server; receiving, on the data interface, further shape data corresponding to an aspect of the second image; and generating, by the processor, a second primary output image based at least upon the further shape data and the avatar data.

The method may further include receiving, on the first computing device, a second image, wherein the first image and the second image include images of a video sequence; sending, on the data interface, the second image to a server; receiving, on the data interface, further shape data corresponding to an aspect of the second image; and generating, by the processor, an second primary output image based at least upon the further shape data and second avatar data. The second avatar data may include the avatar data. The first image may be sent to the server prior to receiving the second image.

The method may further include receiving, on the first computing device, audio data; sending, on the data interface, the audio data to the server; receiving, on the data interface, audio parameters relating to the audio data; and generating, by a processor of the first computing device, output audio based upon the audio parameters and the avatar data. Generating the output audio may include applying a filter to the audio data.

The avatar data may include an avatar image.

A system for generating an image is disclosed which includes a first computing device including: a data interface; a processor coupled to the data interface; and a memory coupled to the processor including instructions executable by the processor for: receiving a first image; sending, on the data interface, the first image to a server; receiving, on the data interface, shape data corresponding to an aspect of the first image; and generating an output image based at least upon the shape data and avatar data. The system may further include a display screen coupled to the processor, wherein the memory further includes instructions for presenting the output image on the display screen. The system may further include a camera coupled to the processor, wherein the memory further includes instructions for receiving the first image from the camera.

A system for generating and transmitting an image is also disclosed which includes a personal computing device including: a data interface; a processor coupled to the data interface; and a memory coupled to the processor including instructions executable by the processor for: receiving an image; sending, on the data interface, the image to a server; receiving, on the data interface, shape data corresponding to an aspect of the image; and generating an output image based at least upon the shape data and avatar data; and the server including: a server data interface; a server processor coupled to the server data interface; and a server memory coupled to the server processor including instructions executable by the server processor for: receiving the image; generating, by the server processor, shape data according to an aspect of the image; sending, on the server data interface, the shape data to the first computing device; generating, on the server processor, a server output image based at least upon the shape data and avatar data; and sending, on the server data interface, the server output image to a second computing device. The system may further include a plurality of personal computing devices, wherein the server output image is generated based upon shape data relating to images from the plurality of personal computing devices.

Further features and forms of the present invention will become apparent from the following detailed description.

DRAWINGS

To assist in understanding the invention and to enable a person skilled in the art to put the invention into practical effect, preferred embodiments of the invention are described below by way of example only with reference to the accompanying drawings, in which.

Figure 1:
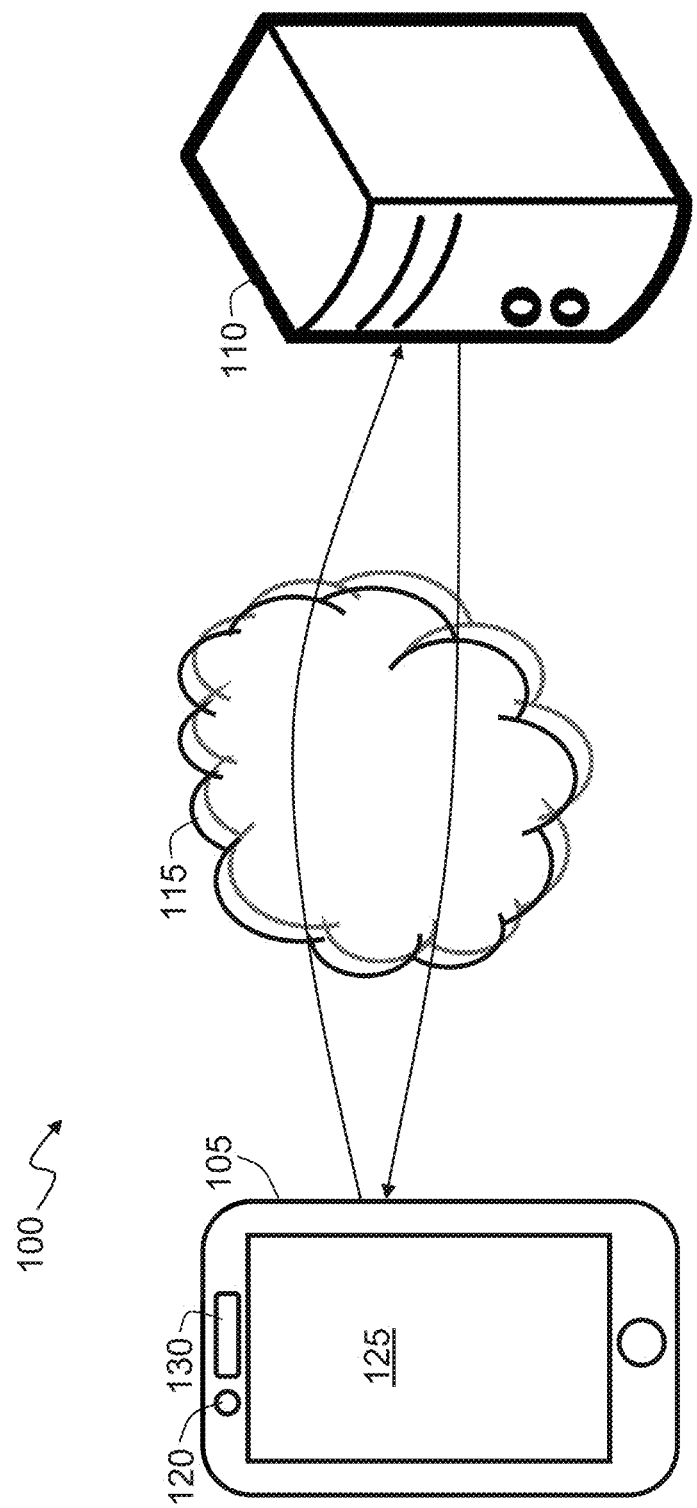
FIG. 1 illustrates a system for generating an image.
Figure 3A:
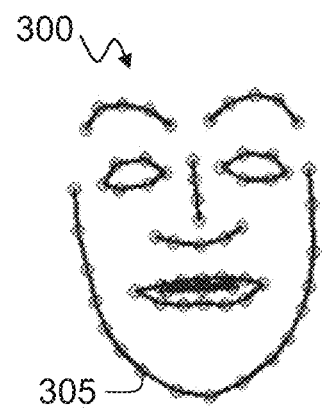
Figure 3B:
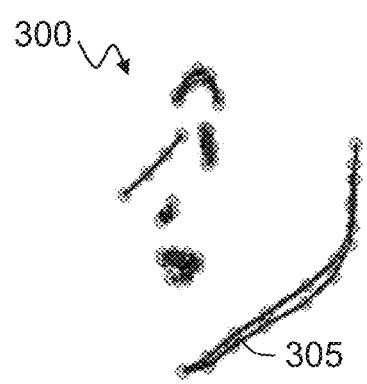
Figure 4:
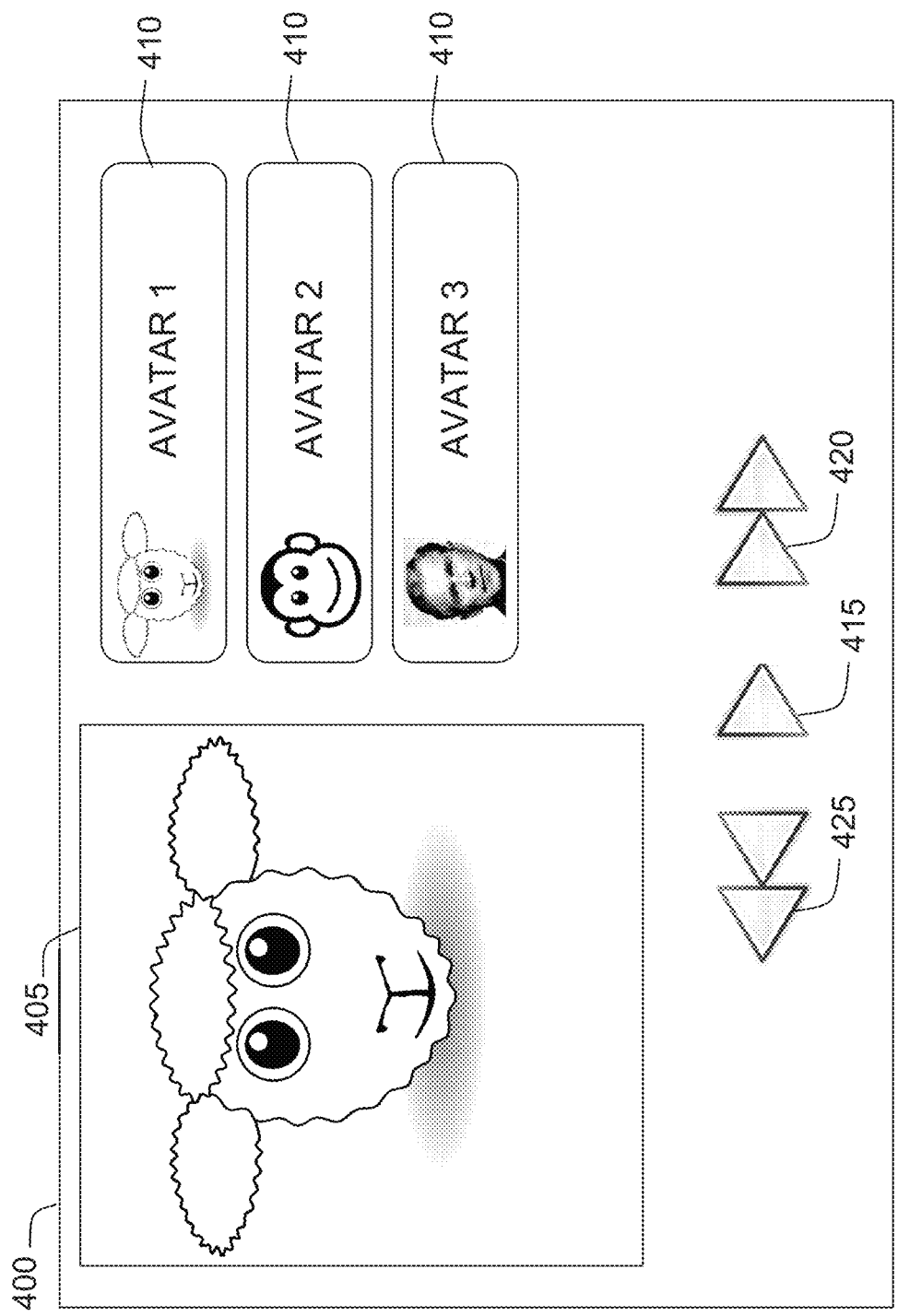
Figure 5:
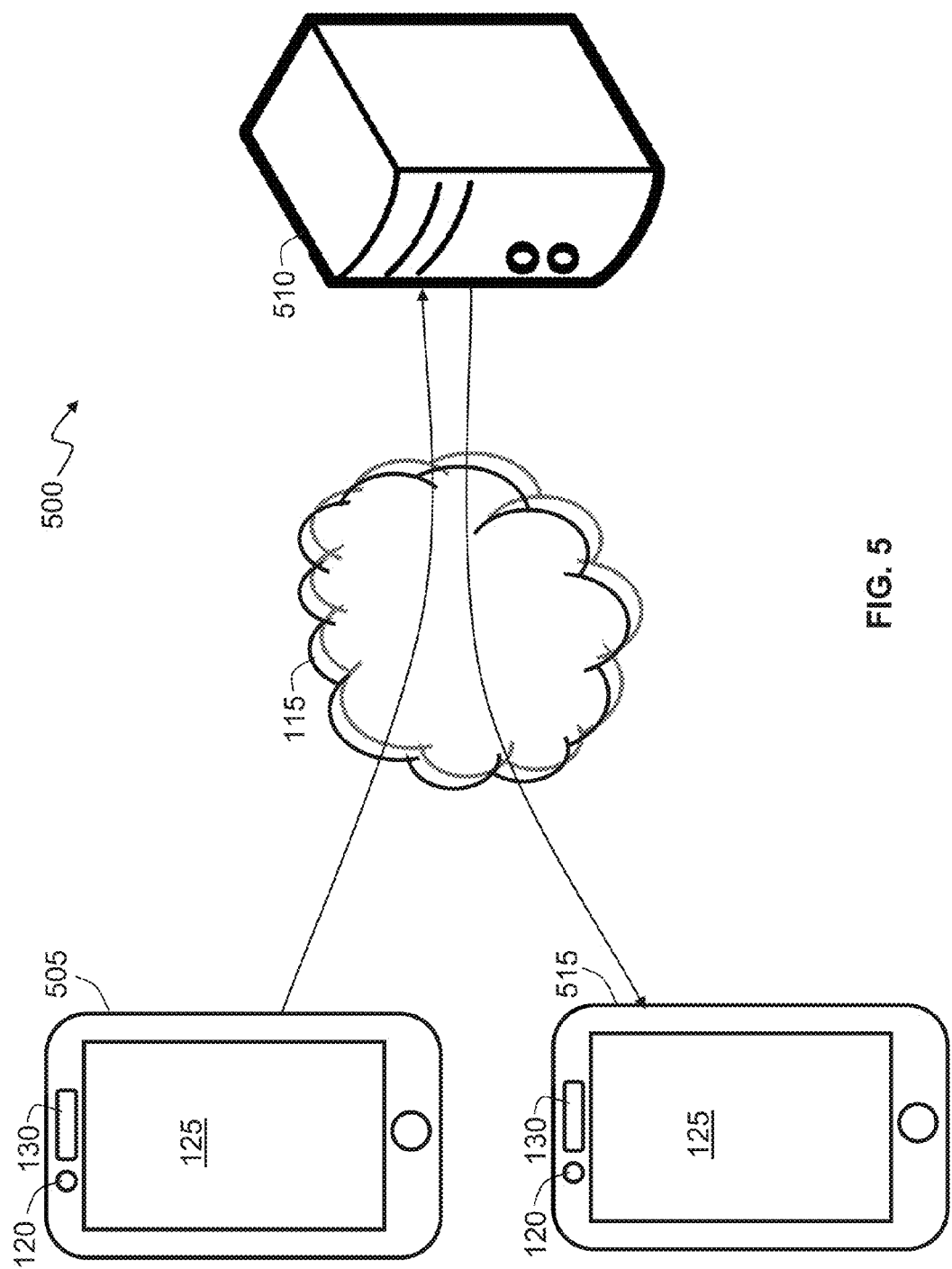
Figure 6:
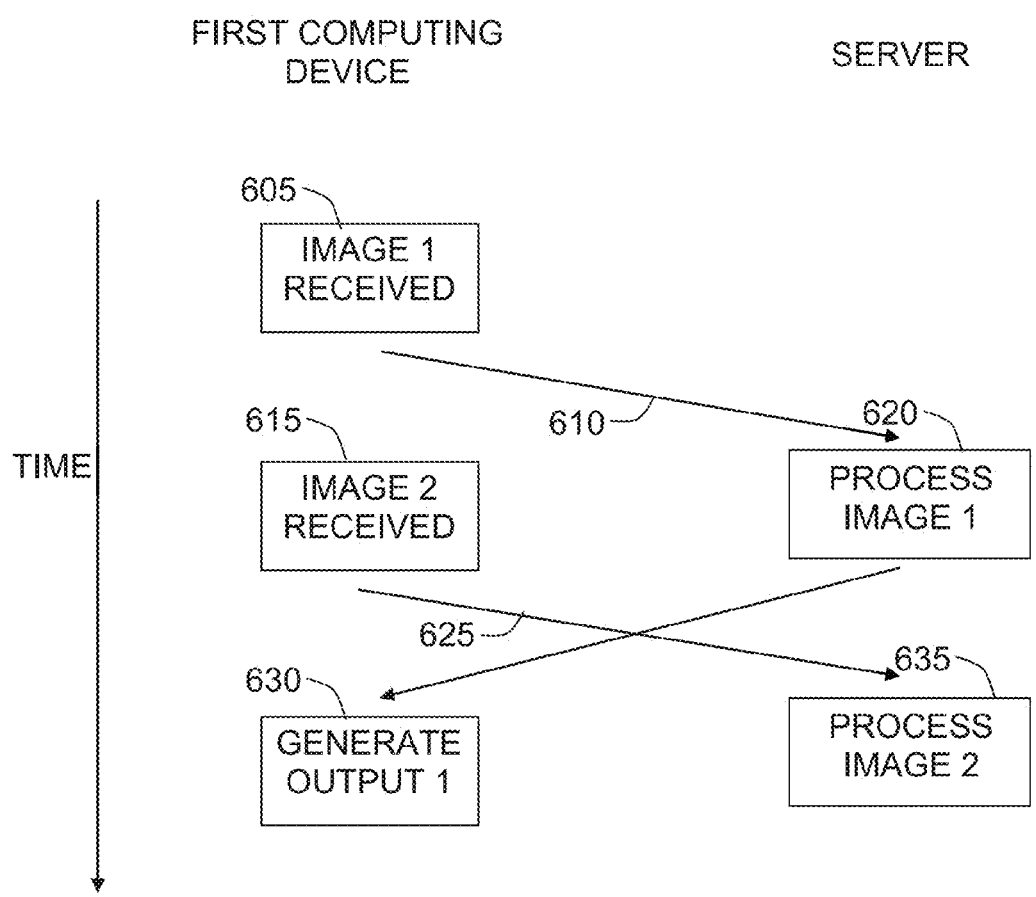
Figure 7:
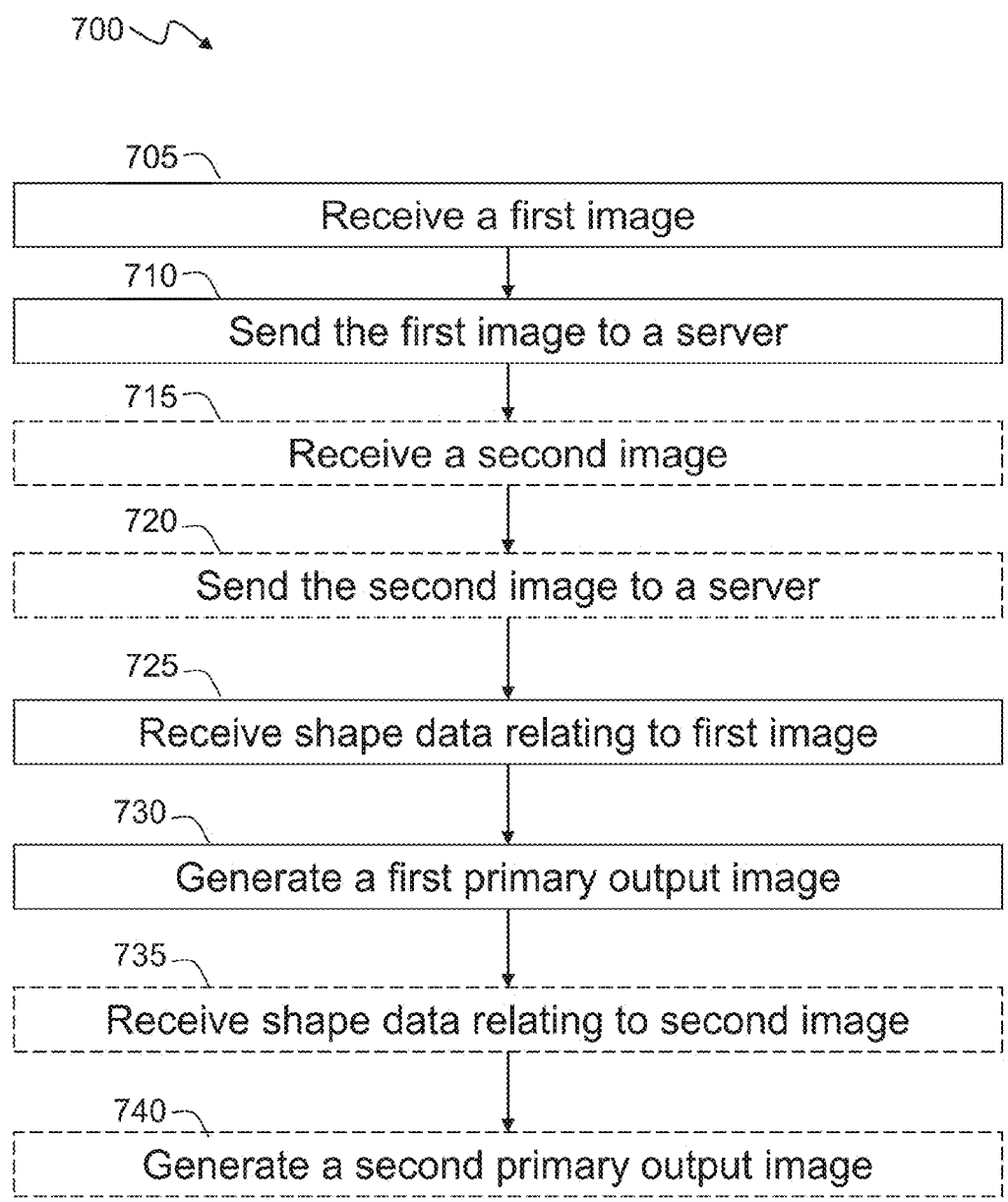

FIG. 3*a* illustrates a front view of shape data of the system of FIG. 1;

FIG. 3*b* illustrates a side view of the shape data of FIG. 3*a*;

FIG. 4 illustrates a screenshot of an avatar selection screen of the system of FIG. 1;

FIG. 5 illustrates a system for generating an image;

FIG. 6 illustrates a message flow diagram of a communication between a first computing device and a server;

FIG. 7 illustrates a method of generating an image; and

Figure 8:
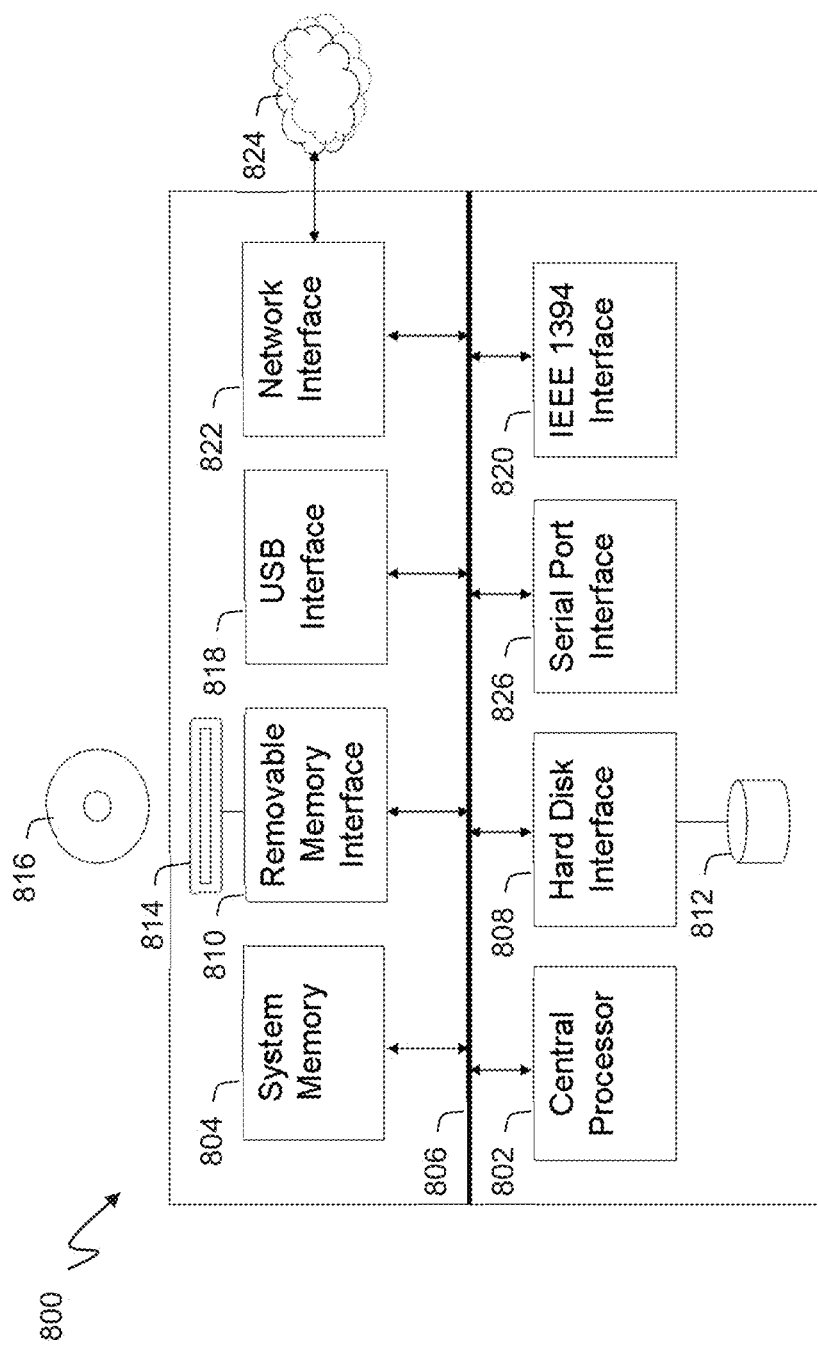

FIG. 8 diagrammatically illustrates a computing device.

Those skilled in the art will appreciate that minor deviations from the layout of components as illustrated in the drawings will not detract from the proper functioning of the disclosed embodiments of the present invention.

DETAILED DESCRIPTION

An image and video generation systems and methods are described and illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, a method of generating an image, includes: receiving, on a first computing device, a first image; sending, on a data interface of the first computing device, the first image to a server; receiving, on the data interface and from the server, shape data corresponding to an aspect of the first image; and generating, by a processor of the first computing device, a primary output image based at least upon the shape data and avatar data.

Advantages of certain embodiments include an ability for a user to animate an avatar, on a device with limited processing capabilities. The animation can occur with low delay, and the avatar can be changed dynamically. The resulting image or video of the animated avatar can then be sent to another user, a social media or a video sharing site, with good bandwidth efficiency.

The embodiments described below refer to generation of an image. One skilled in the art should understand that the image may be an image of a video sequence. Furthermore, the embodiments can be easily extended to support video generation, without necessarily treating each image as a single independent image. For example, timing information can be associated with each image of a video sequence, which can then be applied as timing information to any output video sequence.

Additionally, the term avatar data is used to describe any type of image and/or audio data in which movement or an expression can be transferred. The avatar data can be based on an artificial character, such as a cartoon character, or based on an image of a real person. Further, the avatar data can be based upon a non-human character, for example an animal or fantasy creature such as an alien, or include inanimate or fantasy creations which have a face or other body part superimposed thereon.

With reference now to the figures, FIG. 1 illustrates a system 100 for generating an image, according to an embodiment of the present invention. The system 100 includes a first computing device 105 and a server 110. The first computing device 105 and the server 110 are coupled via a data communications network 115.

The first computing device 105 includes a camera 120, a display screen 125 and a microphone 130, all coupled to a processor (not shown), which is in turn coupled to a data interface (not shown). The first computing device further includes a memory (not shown) coupled to the processor including instructions executable by the processor, for performing methods of the present invention, as discussed further below.

The first computing device 105 can be a low end device, such as a mobile telephone, Personal Digital Assistant (PDA), tablet computer, or other similar device. The server can be a dedicated computing device, for example, and is advantageously able to serve several first computing devices 105.

The first computing device 105 sends an image or video to the server 110 that processes the image or video and sends shape parameters back to the first computing device 105. The first computing device 105 then animates an avatar model according to the shape parameters.

Animation of the avatar model is particularly suited to Graphics Processing Units (GPUs) of low end devices, such as mobile phones. Animation can include transferring a facial expression of a user to that of a face of an avatar, or transferring a body configuration or movement. This can include, for example, animating an avatar to include the expressions of a user, causing an avatar to dance or move in a specific way, or to produce specific movements such as sign language.

The avatar model can be located on the first computing device 105, the server 110, or partly on the server 110 and partly on the first computing device 105. Similarly, the avatar model can be sent between the first computing device 105 and the server 110.

Figure 2:
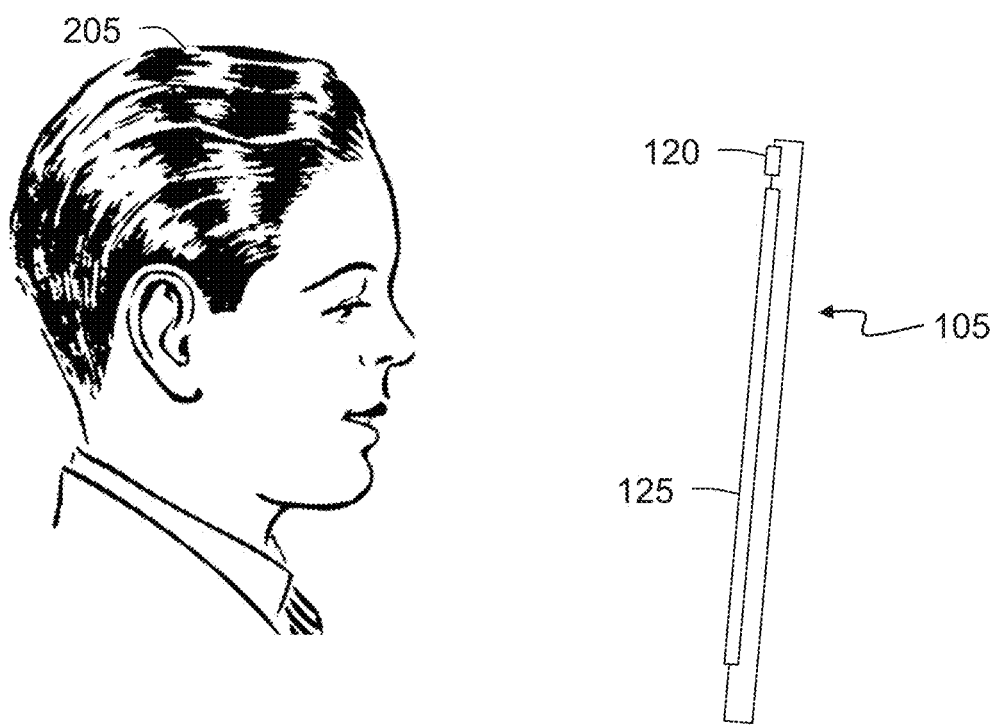
FIG. 2 illustrates a user interacting with a first computing device of the system of FIG. 1.

FIG. 2 illustrates a user 205 interacting with a first computing device 105, according to an embodiment of the present invention.

A plurality of images of the user 205 is captured by the camera 120. After a first image of the plurality of images is captured, it is sent to the server 110 for processing immediately, i.e. without waiting for a second image to be captured or the video to be completely recorded.

If the network is slow or unavailable, the images captured by the first computing device 105 can be saved and sent to the server 110 when the network is available, or sufficiently fast.

According to alternative embodiments of the present invention (not shown), the images are sent to the first computing device 105, or include a downloaded video sequence. As will be readily understood by the skilled addressee, the images need not be captured by the first computing device 105.

The server 110 generates shape data corresponding to an aspect of the first image. An aspect of the image can be a face of the user, a body configuration, or any other suitable aspect. In the case of a face of the user, the shape data can include a 3D model of the user's face from the image. Alternatively, the shape data can include parameters of an Active Appearance Model (AAM). Furthermore, the shape parameters can include a relative camera position.

The server 110 sends the shape data to the first computing device 105, following which the first computing device 105 generates an output image based at least upon the shape data and avatar data.

The avatar data can, for example, include an avatar image that is transformed according to the shape data.

The output image includes applying the 3D model, the AAM parameters, or other shape data to the avatar data, and may include applying a mapping function to the shape data according to the avatar data. Furthermore, the output image can be generated according to a plurality of source-avatar mapping functions, as described in PCT/AU2012/000295, titled "METHOD AND SYSTEM FOR FACIAL EXPRESSION TRANSFER", filed 21 Mar. 2012. The server 110 can generate the source-avatar mapping functions based upon the image, the avatar data and training data. The source avatar mapping functions can then be sent to and used by the first processing computing device 105.

FIG. 3a illustrates a front view of shape data 300, according to an embodiment of the present invention, and FIG. 3b illustrates a side view of the shape data 300.

The shape data includes a plurality of 3D points 305, corresponding to features of a user's face. The features can include an eye, a mouth, eyebrows, jaw shape, or any other features.

FIG. 4 illustrates a screenshot 400 of an avatar selection screen, according to an embodiment of the present invention. The first computing device 105 and the server 110 can include avatar data corresponding to a plurality of avatars, and the avatar selection screen can be used to select an avatar of the plurality of avatars.

The avatar selection screen includes an avatar output image 405, and a plurality of avatar selection buttons 410. Upon selection of an avatar using the avatar selection buttons 410, the output image 405 is updated according to the selected avatar.

The avatar selection screen further includes media control functionality through a play button 415, a fast forward button 420, and a rewind button 425. The play button 415, fast forward button 420, and rewind button 425 can be used to control playback of a video sequence. According to certain embodiments of the present invention, the avatar can be changed during playback using the avatar selection buttons 410.

In this case, an input video sequence can include a plurality of images, including a first image and a second image, which are received by the first computing device 105.

As discussed above, the first image is sent to the server 110, by the first computing device 105. The server 110 sends shape data corresponding to an aspect of the first image to the first computing device 105. The first computing device 105 then generates a primary output image based upon the shape data and avatar data of a first selected avatar.

Subsequently, the second image is sent to the server 110, by the first computing device 105. The server 110 sends further shape data corresponding to an aspect of the second image to the first computing device 105. The first computing device 105 then generates a further primary output image based upon the further shape data and either second selected avatar data, in the case where a new avatar is selected, or the first selected avatar data.

The primary output image and the further primary output image thus form an output video sequence, which includes the selected avatar(s) and which can, for example, be played on the avatar selection screen.

FIG. 5 illustrates a system 500 for generating an image, according to an embodiment of the present invention.

The system 500 includes a first computing device 505, a server 510 and a second computing device 515. The first computing device 505 and the server 510 are similar to the first computing device 105 and the server 110 of FIG. 1.

The first computing device 505 receives an image, for example from the camera 120 of the first computing device 505, and sends it to the server 510, as described above. The server 510 then generates shape parameters, and sends the shape parameters to the first computing device 505.

A user of the first computing device 505 can then generate an output image according to data of different avatars, and select an avatar, as described above with reference to in FIG. 4.

After selecting an avatar, the user may then choose to forward the output video to another user. In this case, a message is sent from the first computing device 505 to the server 510, including details of the second user and/or second user device 515, and the chosen avatar.

Each avatar can be associated with a unique identifier. In this case, the first computing device 505 need only send the unique identifier to the server 510.

According to certain embodiments, the server 510 then generates a server output image based upon server avatar data associated with the identifier, and the shape parameters.

The server avatar data may be identical to the avatar data of the first computing device 505, or may include extra detail corresponding to any extra processing power available to the server 510. Similarly, the server 510 can apply a different algorithm than an algorithm used by the first computing device 505 to generate the primary output image, in order to generate a more accurate or realistic server output image.

The server 510 then sends the server output image to the second computing device 515.

According to other embodiments, the server 510 sends details of the chosen avatar, for example an identifier identifying the chosen avatar, to the second computing device 515 together with the shape parameters. The second computing device 515 can then render the output image according to the shape parameters and the chosen avatar.

According to yet other embodiments, the server 510 uploads the server output image to a social networking site, to a file, image or video sharing site, or to another site.

Generation of the output image can include generating an independent output image, or include modifying the first image. Additionally, the first image can be encoded, and any subsequent images can be differentially encoded with respect to the first image.

According to an alternative embodiment (not shown), the server output image and/or the primary output image is generated based upon shape data from several images. Accordingly, the output image can combine aspects from several images, such as expressions from several users. Similarly, the shape data from several images can include data relating to several users, such as facial expressions of several users.

FIG. 6 illustrates a message sequence diagram 600 of a communication between a first computing device 105, 505 and a server 110, 510, according to an embodiment of the present invention.

In step 605 a first image is received on the first computing device 105, 505. The first image can be from a camera, or any other source.

In step 610, the first image is sent to the server 110, 510 for processing.

In step 615, the second image is sent to the server 110, 510 for processing, without waiting for the first image to be processed. This allows for near real time processing of the video, as only a single round-trip-time delay is added, rather than a cumulative delay or delay corresponding to the length of the video sequence.

In step 620, the first image is processed by the server 110, 510 and the shape parameters are sent from the server 110, 510 to the first computing device 105, 505 in step 625. The first computing device 105, 505 then generates and displays the output image in step 630.

In step 635, the second image is processed by the server 110, 510.

FIG. 7 illustrates a method 700 of generating an image, according to an embodiment of the present invention.

In step 705, a first image is received by a first computing device. The first image can be received directly from a camera, or by another means.

In step 710, the first image is sent to a server.

In step 715, a second image is received by the first computing device. In step 720, the second image is sent to the server.

In step 725, shape data relating to the first image is received by the first computing device from the server. In step 730, the first computing device generates a first primary output image based upon the shape data and avatar data.

In step 735, shape data relating to the second image is received by the first computing device from the server. In step 740, the first computing device generates a first primary output image based upon the shape data of the second image and the avatar data.

Steps 725 and 730 can be performed prior to steps 715 and 720. It is, however, advantageous to send images to the server for processing as they are received by the first computing device, in order to reduce overall delay of the system.

According to certain embodiments of the present invention, the method further includes receiving and processing audio data, such as speech. The audio data is advantageously captured by the microphone 130, and may include timing information in order to accurately synchronize the audio data with the image or video data.

The audio data is sent, on the data interface, to the server for processing, in a similar way to the images described above. The server 110, 510 then processes the audio to generate audio parameters relating to the audio data. The audio parameters are sent to the first computing device 105, 505, and output audio is generated based upon the audio parameters and the avatar data.

The audio parameters can include filter parameters which are used to filter the audio data.

FIG. 8 diagrammatically illustrates a computing device 800, according to an embodiment of the present invention. The first and second computing devices 105, 505, 515 and server 110, 510 can be identical to or similar to the computing device 800. Similarly, the method 700 of FIG. 7 can be implemented using the computing device 800.

The computing device 800 includes a central processor 802, a system memory 804 and a system bus 806 that couples various system components, including coupling the system memory 804 to the central processor 802. The system bus 806 may be any of several types of bus structures including a memory bus or memory controller, a peripheral bus, and a local bus using any of a variety of bus architectures. The structure of system memory 804 is well known to those skilled in the art and may include a basic input/output system (BIOS) stored in a read only memory (ROM) and one or more program modules such as operating systems, application programs and program data stored in random access memory (RAM).

The computing device 800 can also include a variety of interface units and drives for reading and writing data. The data can include, for example, a displacement between the camera and the display screen as discussed above.

In particular, the computing device 800 includes a hard disk interface 808 and a removable memory interface 810, respectively coupling a hard disk drive 812 and a removable memory drive 814 to the system bus 806. Examples of removable memory drives 814 include magnetic disk drives and optical disk drives. The drives and their associated computer-readable media, such as a Digital Versatile Disc (DVD) 816 provide non-volatile storage of computer readable instructions, data structures, program modules and other data for the computer system 800. A single hard disk drive 812 and a single removable memory drive 814 are shown for illustration purposes only and with the understanding that the computing device 800 can include several similar drives. Furthermore, the computing device 800 can include drives for interfacing with other types of computer readable media.

The computing device 800 may include additional interfaces for connecting devices to the system bus 806. FIG. 8 shows a universal serial bus (USB) interface 818 which may be used to couple a device to the system bus 806. For example, an IEEE 1394 interface 820 may be used to couple additional devices to the computing device 800. Examples of additional devices include cameras for receiving images or video, or microphones for recording audio.

The computing device 800 can operate in a networked environment using logical connections to one or more remote computers or other devices, such as a server, a router, a network personal computer, a peer device or other common network node, a wireless telephone or wireless personal digital assistant. The computing device 800 includes a network interface 822 that couples the system bus 806 to a local area network (LAN) 824. Networking environments are commonplace in offices, enterprise-wide computer networks and home computer systems.

A wide area network (WAN), such as the Internet, can also be accessed by the computing device, for example via a modem unit connected to a serial port interface 826 or via the LAN 824.

Transmission of images and/or video can be performed using the LAN 824, the WAN, or a combination thereof.

It will be appreciated that the network connections shown and described are exemplary and other ways of establishing a communications link between computers can be used. The existence of any of various well-known protocols, such as TCP/IP, Frame Relay, Ethernet, FTP, HTTP and the like, is presumed, and the computing device 800 can be operated in a client-server configuration to permit a user to retrieve data from, for example, a web-based server.

The operation of the computing device 800 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCs, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

In summary, advantages of certain embodiments of the present invention include an ability for a user to animate an avatar on a device with limited processing capabilities. The animation can occur with low delay, and the avatar can be changed dynamically. The resulting image or video of the animated avatar can then be sent to another user, with good bandwidth efficiency.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

What is claimed is:

1. A method of generating an image comprising:
receiving, on a first computing device, a first image;
sending, on a data interface of the first computing device, the first image to a server;
receiving, on the data interface and from the server, shape data corresponding to an aspect of the first image;
generating, by a processor of the first computing device, a primary output image based at least upon the shape data and selected avatar data corresponding to a selected one of a plurality of avatars, the selected avatar data on both the first computing device and the server;
storing a plurality of unique identifiers each being uniquely associated with the plurality of avatars available for use on the first computing device;
subsequent to the generating of the primary output image on the first computing device:
further receiving, on the data interface of the first computing device, a selected one of the plurality of unique identifiers associated with the selected avatar data;
sending, on the data interface of the first computing device, only the unique identifier associated with the selected one of the plurality of avatars to the server;
generating, by the server, a server output image based upon server avatar data associated with the unique identifier and the shape data, and
further using the server to transmit only the server output image to a second computing device.

2. The method according to claim 1, wherein the shape data comprises a 3D model of a user's face as depicted in the image, and wherein generating the primary output image comprises applying the 3D model to the selected avatar data.

3. The method according to claim 1, wherein the shape data comprises Active Appearance Model (AAM) parameters, and wherein generating the primary output image comprises applying the AAM parameters to the selected avatar data.

4. The method according to claim 1, wherein generating the primary output image further comprises applying a mapping function to the shape data according to the selected avatar data.

5. The method according to claim 1, wherein the server output image is identical to the primary output image.

6. The method according to claim 1, wherein generating the server output image by the server is conducted according to a different algorithm than an algorithm used by the first computing device to generate the primary output image.

7. The method according to claim 1, further comprising:
sending, on the data interface of the first computing device, a request to the server to send the server output image to a user of second computing device, wherein the request includes contact details of the user; and
sending, from the server and to the user of the second computing device, using the contact details of the user, the server output image.

8. The method according to claim 1, further comprising:
sending, on the data interface, a request to the server to share primary output image with a user of the second computing device, wherein the request includes contact details of the user and the selected avatar; and
sending, from the server and to the user of the second computing device, using the contact details of the user, the shape parameters and the selected avatar, for generation of the primary output image by the second computing device.

9. The method according to claim 8, wherein sending the selected avatar comprises sending an identifier associated with the selected avatar.

10. The method according to claim 1, wherein generating the primary output image comprises modifying the first image.

11. The method according to claim 1, further comprising:
sending, on the data interface of the first computing device, a request to the server to upload the server output image to a social media site or a video sharing site, wherein the request includes details of the social media site or the video sharing site, and a selected avatar; and
sending, from the server and to the social media site or the video sharing site, using the details of the social media site or the video sharing site, the server output image.

12. The method according to claim 1, wherein the first image comprises an image of a video sequence.

13. The method according to claim 1, further comprising:
receiving, on the data interface of the first computing device, a second image, wherein the first image and the second image comprise images of a video sequence;
sending, on the data interface of the first computing device, the second image to a server;
receiving, on the data interface of the first computing device, further shape data corresponding to an aspect of the second image; and
generating, by the processor of the first computing device, a second primary output image based at least upon the further shape data and the avatar data.

14. The method according to claim 13, wherein sending the first image to the server is conducted prior to receiving the second image.

15. The method according to claim 1, further comprising uploading the server output image with the server to a social media site.

16. A system for generating an image, comprising:
a first computing device including:
a data interface;
a processor coupled to the data interface; and
a memory coupled to the processor including instructions executable by the processor for:
receiving a first image;
sending, on the data interface, the first image to a server;
receiving, on the data interface, shape data corresponding to an aspect of the first image;
generating an output image based at least upon the shape data and selected avatar data, corresponding to a selected one of a plurality of avatars, the selected avatar data on both the first computing device and the server;
storing a plurality of unique identifiers each being uniquely associated with the plurality of avatars available for use on the first computing device;
subsequent to the generating of the output image on the first computing device:
receiving, on the data interface of the first computing device, a selected one of the plurality of unique identifiers associated with the selected avatar data; and
sending, on the data interface, only the unique identifier associated with the selected one of the plurality of avatars to the server; and
the server including:
a server data interface;
a server processor coupled to the server data interface; and
a server memory coupled to the server processor including instructions executable by the server processor for:
receiving the first image;
receiving the unique identifier; and
generating a server output image based upon server avatar data associated with the unique identifier, and the shape data, and
transmitting only the server output image to a second computing device for use.

* * * * *